(12) United States Patent
Margol et al.

(10) Patent No.: US 11,331,778 B2
(45) Date of Patent: May 17, 2022

(54) FLOW CONTROL VALVE ASSEMBLY AND COMPLEMENTARY ADJUSTMENT TOOL SET

(71) Applicant: Ham-Let (Israel—Canada) Ltd, Nazareth Illit (IL)

(72) Inventors: Boris Margol, Nazareth Illit (IL); Sergey Seryogin, Nazareth Illit (IL); Felix Shestatski, Nazareth Illit (IL); Olga Fonaryov, Haifa (IL)

(73) Assignee: Ham-Let (Israel—Canada) Ltd, Nazareth Illit (IL)

( * ) Notice: Subject to any disclaimer, the term of this patent is extended or adjusted under 35 U.S.C. 154(b) by 0 days.

(21) Appl. No.: 17/053,241

(22) PCT Filed: May 8, 2019

(86) PCT No.: PCT/IL2019/050530
§ 371 (c)(1),
(2) Date: Nov. 5, 2020

(87) PCT Pub. No.: WO2019/215744
PCT Pub. Date: Nov. 14, 2019

(65) Prior Publication Data
US 2021/0138620 A1     May 13, 2021

(30) Foreign Application Priority Data
May 9, 2018   (IL) .......................................... 259255

(51) Int. Cl.
*B25B 27/24*     (2006.01)
*B25B 13/06*     (2006.01)
(Continued)

(52) U.S. Cl.
CPC .............. *B25B 27/24* (2013.01); *B25B 13/06* (2013.01); *B25B 13/10* (2013.01); *B25B 13/16* (2013.01);
(Continued)

(58) Field of Classification Search
CPC ................................ B25B 27/24; B25B 23/10
(Continued)

(56) References Cited

U.S. PATENT DOCUMENTS 3,855,882 A  * 12/1974  Wittmann ............... B25B 13/48
                                                        81/124.7
4,558,605 A    12/1985  Tanner
(Continued)

FOREIGN PATENT DOCUMENTS

EP          3287679         2/2018

OTHER PUBLICATIONS

International Search Report and Written Opinion in Application No. PCT/IL2019/050530, dated Aug. 13, 2019, in 7 pages.
(Continued)

*Primary Examiner* — Hadi Shakeri
(74) *Attorney, Agent, or Firm* — Knobbe, Martens, Olson & Bear, LLP

(57) ABSTRACT

According to one aspect, a fluid control system is provided comprising a servicing tool set and at least one valve assembly comprising an actuator and a valve operationally engageable therewith; each valve comprising a valve body; each actuator comprising an actuator body having an upper base and side walls; wherein each actuator body is engageable with a valve body, and wherein the system is configured to allow: engaging the servicing tool set with an actuator and subsequently applying torque to an actuator body engaged with a valve body and thereby disengaging the actuator body from the valve body; the at least one valve assembly
(Continued)

comprising at least one Normally Closed (NC) valve; wherein the NC valve is configured to allow activating an actuator engaged therewith with pressurized fluid and thereby opening the NC valve, wherein the actuator comprises a nipple and the servicing tool set comprises a ratchet and at least one socket engageable with the actuator body, and wherein the at least one socket is sized and shaped to accommodate the nipple, and wherein the servicing tool set is further configured to allow operationally coupling the pressurized fluid to the actuator.

11 Claims, 12 Drawing Sheets

(51) Int. Cl.

| | | |
|---|---|---|
| *B25B 13/10* | (2006.01) | |
| *B25B 13/16* | (2006.01) | |
| *B25B 13/46* | (2006.01) | |
| *B25B 13/48* | (2006.01) | |
| *F16K 31/12* | (2006.01) | |
| *F16K 31/126* | (2006.01) | |
| *F16K 31/14* | (2006.01) | |
| *B25B 23/10* | (2006.01) | |

(52) U.S. Cl.
CPC ............ *B25B 13/465* (2013.01); *B25B 13/48* (2013.01); *B25B 23/10* (2013.01); *F16K 31/12* (2013.01); *F16K 31/126* (2013.01); *F16K 31/1268* (2013.01); *F16K 31/14* (2013.01)

(58) Field of Classification Search
USPC .................................................. 81/124.2, 125
See application file for complete search history.

(56) References Cited

U.S. PATENT DOCUMENTS

| | | | |
|---|---|---|---|
| 4,920,834 A * | 5/1990 | Womack | B25B 13/06 81/126 |
| 5,967,176 A | 10/1999 | Blann et al. | |
| 6,609,445 B2 * | 8/2003 | Elmore | B25B 13/48 81/124.2 |
| 7,004,214 B1 * | 2/2006 | Awad | B25B 7/02 141/351 |
| 7,581,471 B2 * | 9/2009 | Chiu | B25B 13/483 81/467 |
| 8,984,992 B2 * | 3/2015 | Newkirk | B25B 13/06 81/125 |
| 9,314,906 B2 * | 4/2016 | Nelson | B25B 13/06 |
| 9,943,947 B2 * | 4/2018 | Tseng | B25B 13/06 |
| 2015/0260306 A1 | 9/2015 | Arnold et al. | |
| 2016/0263605 A1 | 9/2016 | Robert | |
| 2017/0037839 A1 | 2/2017 | Maguire | |
| 2018/0195636 A1 | 7/2018 | Zuber et al. | |

OTHER PUBLICATIONS

Supplementary Search report in corresponding European Patent Application No. 19799058.3, dated Jun. 7, 2021, in 3 pages.

* cited by examiner

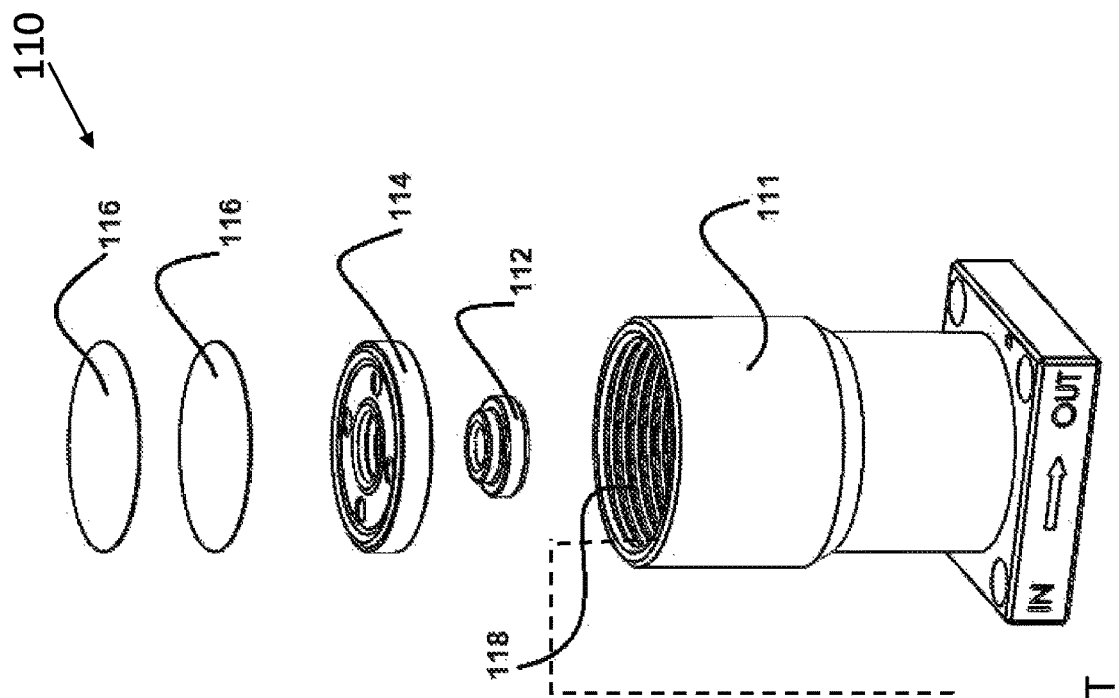
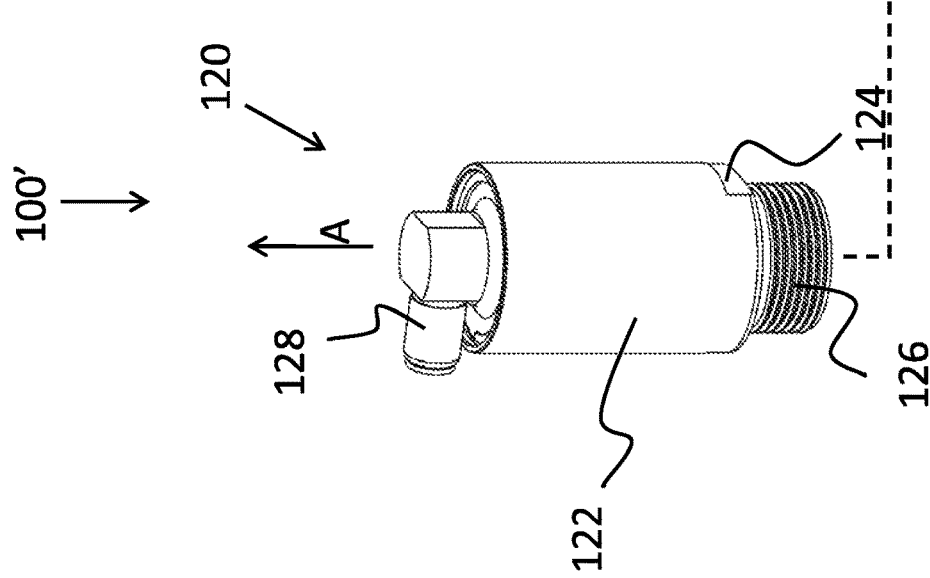
Figure 1a
PRIOR ART

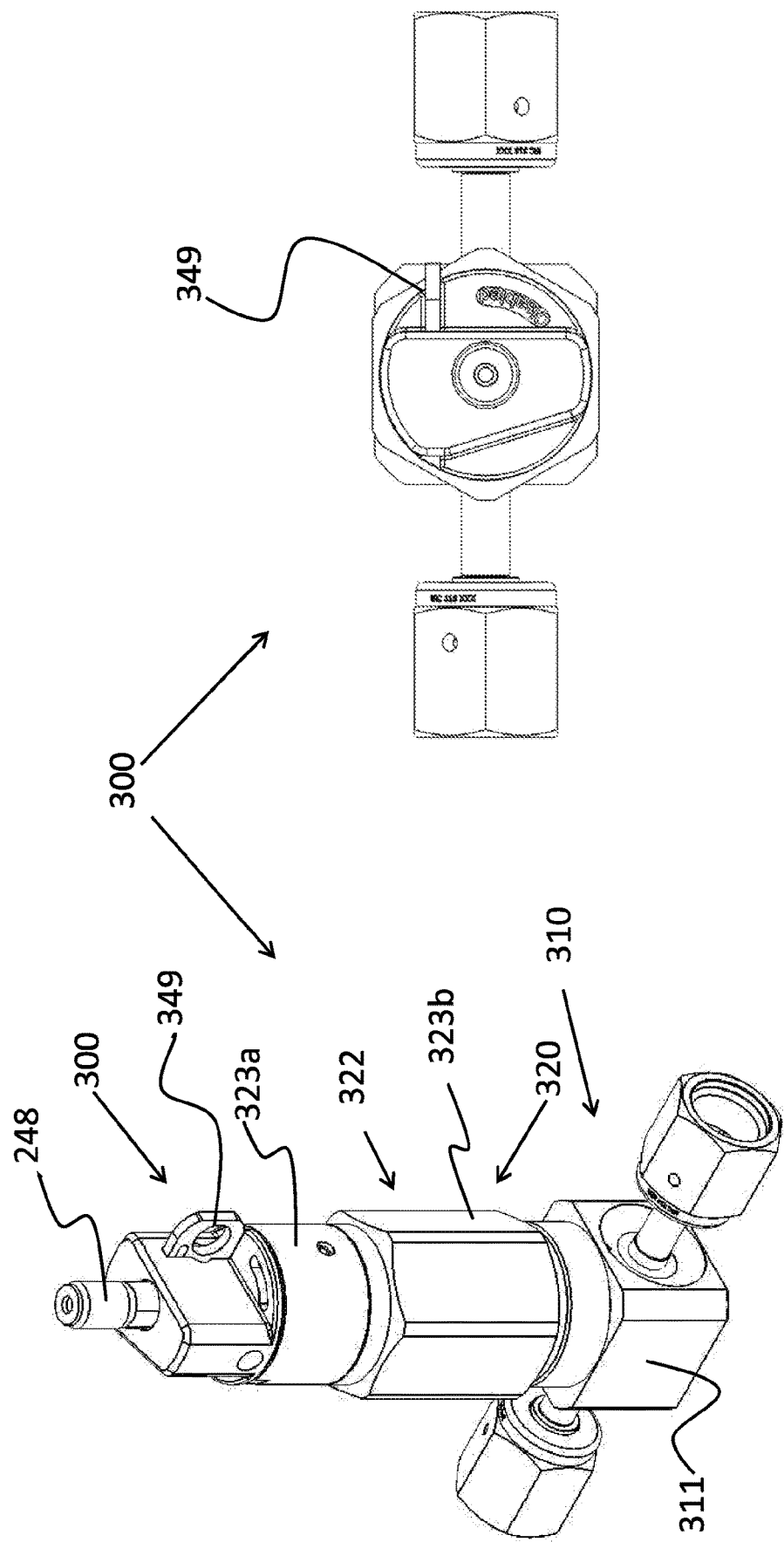

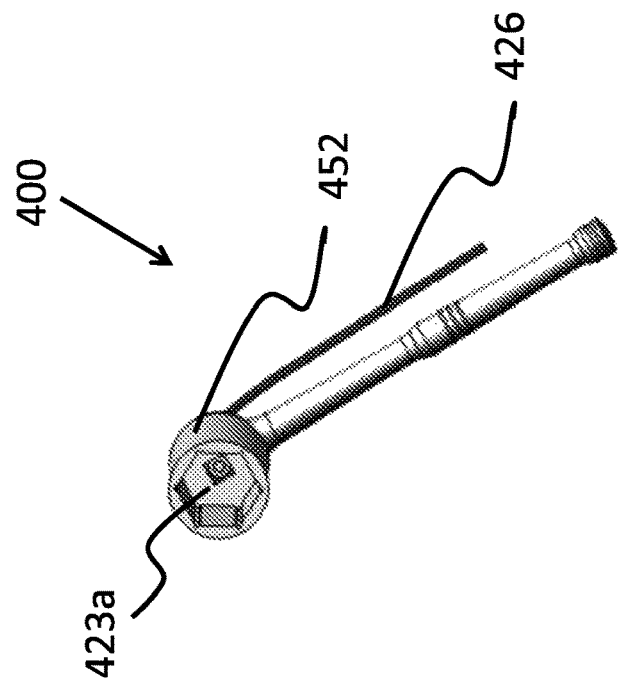
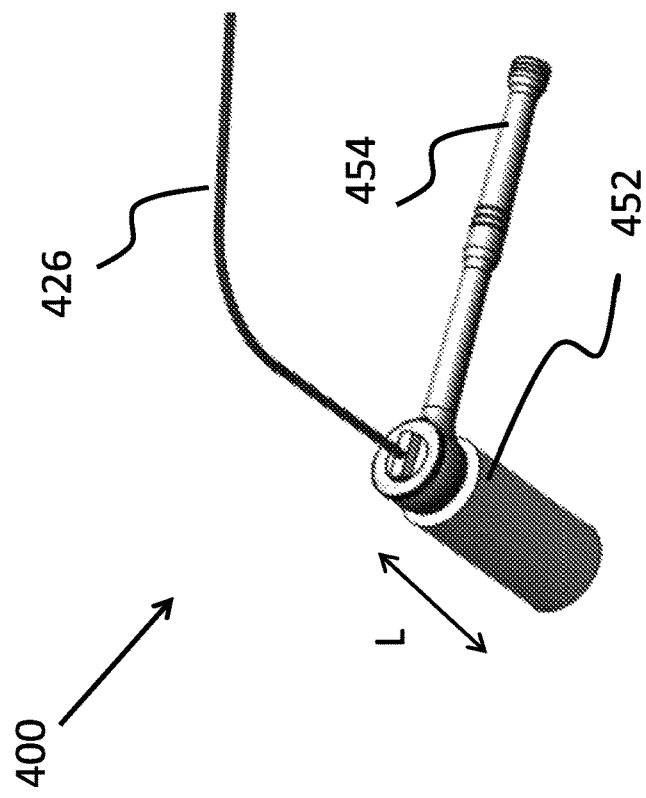
Figure 4b
Figure 4a

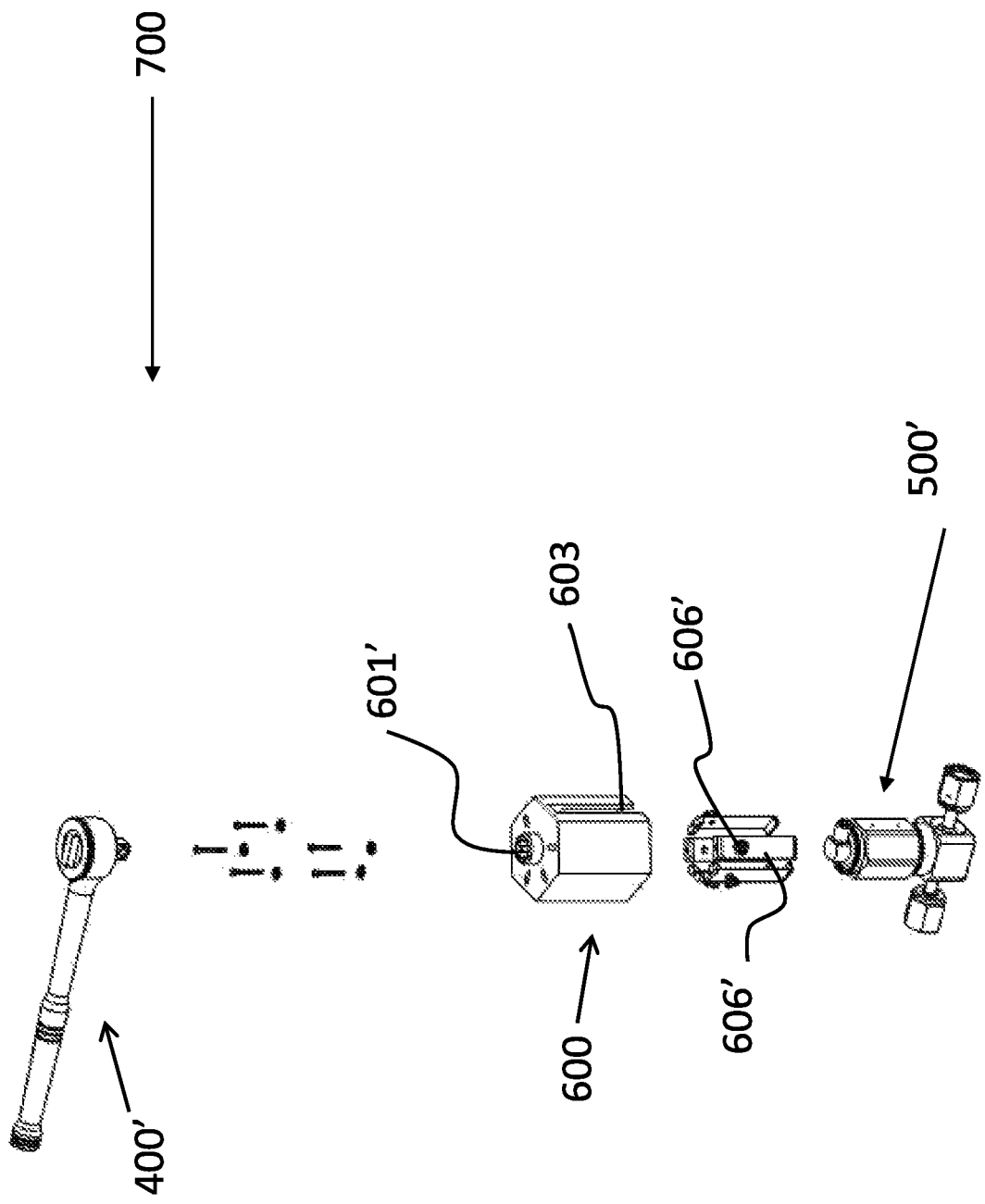

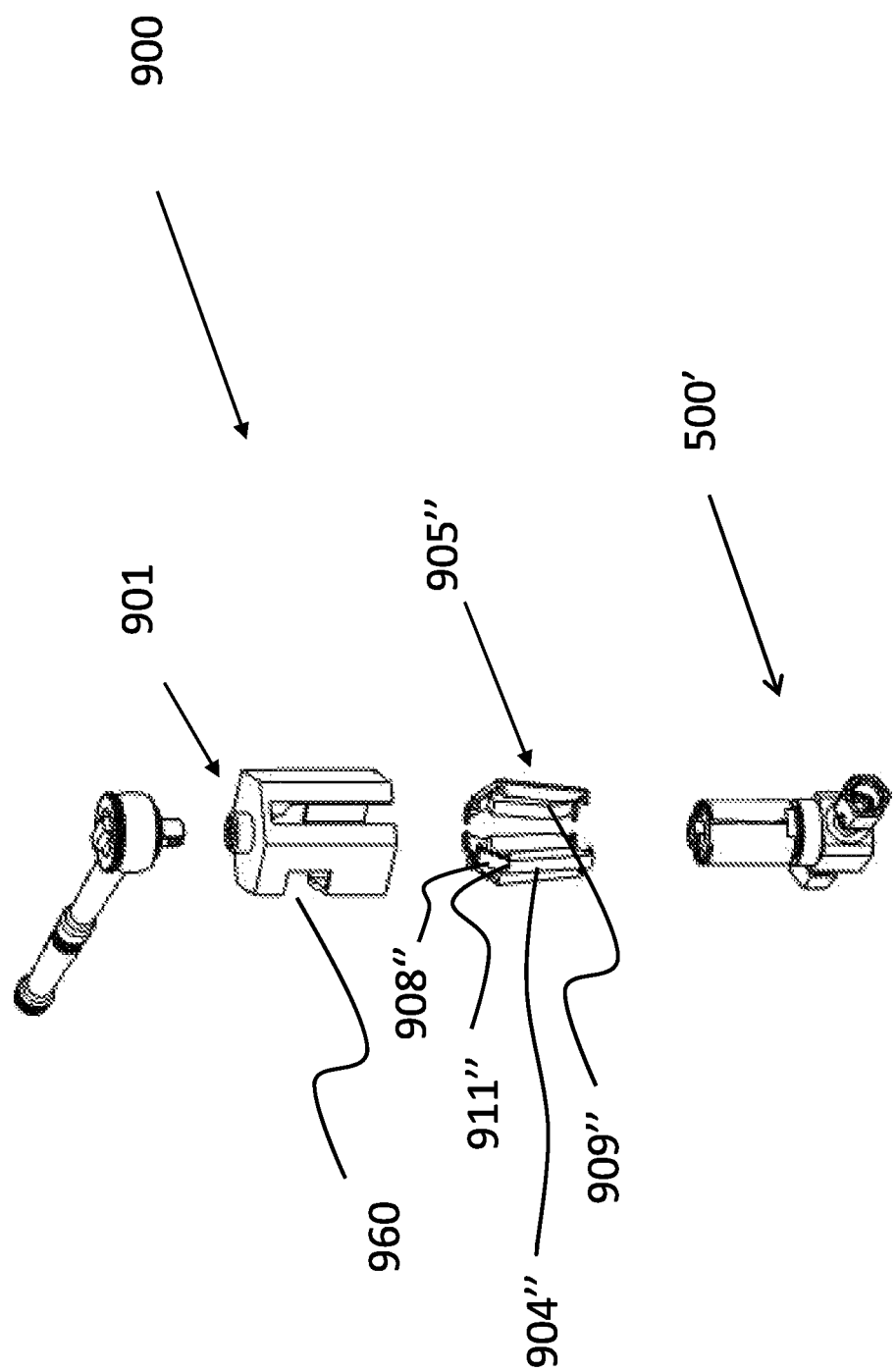

FLOW CONTROL VALVE ASSEMBLY AND COMPLEMENTARY ADJUSTMENT TOOL SET

CROSS-REFERENCE TO RELATED APPLICATIONS

This application is a national stage application under 35 U.S.C. § 371 of International Application No. PCT/IL2019/050530, filed on May 8, 2019, which published in English as WO 2019/215744 A1 on Nov. 14, 2019, and which claims priority benefit of IL Patent Application No. 259255, filed on May 9, 2018.

BACKGROUND

Precision processes and precision machinery typically demands precise control of fluid flows. One of the tools for this is a flow control valve, often selectively switched between open and close states by an actuator, in the path of pipes through which gases or liquids flow. We may refer to a fluid control valve and connected actuator as a "valve assembly".

Building a flow control valve and an actuator that stays within all of a machine's constraints is nontrivial. One of those constraints may be that the valve and its actuator fit in a tight space, and, consequently, servicing the actuator and valve, e.g., calibrating or otherwise adjusting the valve assembly without disassembling the surrounding parts can be difficult.

A precision actuator for the valve is commonly controlled by air pressure, which adjusts the size—that is, the area of the smallest cross-section—of the internal space through which the fluids or must pass.

Some valves assemblies are normally open (NO), meaning that the internal valve space is open to flow when the actuator is in a resting position and closed to flow when the actuator is activated, i.e., moved away from the resting position into a different position and/or orientation.

Other valves assemblies are normally closed (NC), meaning that internal valve space is closed to flow when the actuator is in a resting position and open to flow when the actuator is activated, i.e., moved away from the resting position into a different position and/or orientation.

An NC valve assembly may require activation of the actuator to hold the valve in a fully open position when servicing in order to avoid damaging the valve. The need to simultaneously maintain actuator activation by means such as application of air pressure to the actuator while servicing can further complicate servicing the valve assembly in tight configurations.

The description above is presented as a general overview of related art in this field and should not be construed as an admission that any of the information it contains constitutes prior art against the present patent application.

SUMMARY

This summary is provided to introduce a selection of concepts in a simplified form that is further described below in the detailed description. This summary is not intended to identify key features or essential features of the claimed subject matter, nor is it intended to be used to limit the scope of the claimed subject matter.

According to one aspect, a fluid control system is provided comprising a servicing tool set and at least one valve assembly comprising an actuator and a valve operationally engageable therewith;
each valve comprising
a valve body;
each actuator comprising an actuator body having an upper base and side walls;
wherein each actuator body is engageable with a valve body, and
wherein the system is configured to allow:
engaging the servicing tool set with an actuator and subsequently applying torque to an actuator body engaged with a valve body and thereby disengaging the actuator body from the valve body;
the at least one valve assembly comprising at least one Normally Closed (NC) valve;
wherein the NC valve is configured to allow activating an actuator engaged therewith with pressurized fluid and thereby opening the NC valve,
wherein the actuator comprises a nipple and the servicing tool set comprises a ratchet and at least one socket engageable with the actuator body, and wherein the at least one socket is sized and shaped to accommodate the nipple, and
wherein the servicing tool set is
further configured to allow operationally coupling the pressurized fluid to the actuator.

According to another aspect a fluid control system is provided comprising a servicing tool set and at least one valve assembly comprising an actuator and a valve operationally engageable therewith;
each valve comprising
a valve body;
each actuator comprising an actuator body having an upper base and side walls;
wherein each actuator body is engageable with a valve body, and wherein:
the system is configured to allow:
engaging the servicing tool set with the actuator, and subsequently applying torque to an actuator body engaged with a valve body and thereby disengaging the actuator body from the valve body;
the at least one valve assembly comprising at least one Normally Closed (NC) valve;
wherein the NC valve is configured to allow activating an actuator engaged therewith with pressurized fluid and thereby opening the NC valve;
wherein the servicing tool set comprises a ratchet and at least one socket engageable with the ratchet and with at least one actuator body, and
wherein activating the actuator is via at least one ratchet.

In some embodiments each of the at least one socket comprises a wall having a free end, and an aperture in the wall and/or a slot extending in the wall from the free end, wherein the aperture and/or slot are sized and shaped to accommodate a nipple, the nipple sized and shaped to allow activating the actuator with the pressurized fluid.

In some embodiments the ratchet is configured to allow a pressurized fluid tube to be connected thereto, and pressurized fluid within the tube to pass via the ratchet into the actuator.

In some embodiments the actuator body has a manual override, and the socket has sufficient length L to reach an engagement region of the actuator body.

In some embodiments the actuator body and/or the socket further comprise at least one guide to facilitate correct alignment.

In some embodiments the pressurized fluid is selected from air, water and oil.

In some particular embodiments the pressurized fluid is oil.

In some embodiments the tool set comprises a socket having resilient means for firmly engaging the actuator.

In some embodiments resilient means are selected from a resilient material, at least one resilient element and combinations thereof.

In some embodiments the tool set comprises at least one socket having at least one prong capable of firmly engaging the actuator, each at least one prong comprising a body and two ends.

In some embodiments the socket further comprises resilient means for firmly engaging the actuator.

In some embodiments the body of at least one of the prongs comprises a bulge.

In some embodiments at least one end of at least one of the prongs is thinner than the body.

In some embodiments, the socket further comprises an aperture allowing application of pressure at least one prong.

In some embodiments, at least one of the prongs further comprises a corner between each end and the body, the configured to allow application of pressure at least one corner facilitating release of the socket from engagement with the actuator.

In some embodiments the socket further comprising at least one hole allowing inserting a screw through the socket and onto the at least one prong.

Some embodiments are configured to allow affixing the at least one prong with a bolt, thereby adjusting the socket's dimensions for various actuator sizes.

Some embodiments are configured to allow affixing the at least one prong with gluing or welding.

In some embodiments the tool set further comprises torque measurement means.

In some embodiments the socket is configured to allow firmly engaging an actuator having a shape selected from one of the shapes: cylinder and prism.

In some embodiments, including any of the embodiments presented above, the socket is made by additive manufacturing.

According to one aspect a fluid control system is provided, comprising a servicing tool set and at least one valve assembly comprising an actuator and a valve operationally engageable therewith;
  each valve comprising
    a valve body;
  each actuator comprising an actuator body having an upper base and side walls;
wherein each actuator body is engageable with a valve body, and
  wherein the system is configured to allow:
  engaging the servicing tool set with an actuator and subsequently applying torque to an actuator body engaged with a valve body and thereby disengaging the actuator body from the valve body;
the at least one valve assembly comprising at least one Normally Closed (NC) valve;
  wherein the NC valve is configured to allow activating an actuator engaged therewith with pressurized fluid and thereby opening the NC valve,
  wherein the actuator comprises a nipple and the servicing tool set comprises a ratchet and at least one socket engageable with the actuator body, and wherein the at least one socket is sized and shaped to accommodate the nipple, and
  wherein the servicing tool set is
  further configured to allow operationally coupling the pressurized fluid to the actuator. [

According to another aspect a fluid control system is provided, comprising a servicing tool set and at least one valve assembly comprising an actuator and a valve operationally engageable therewith;
  each valve comprising
    a valve body;
    each actuator comprising an actuator body having an upper base and side walls;
wherein each actuator body is engageable with a valve body, and wherein:
  the system is configured to allow:
  engaging the servicing tool set with the actuator, and subsequently applying torque to an actuator body engaged with the valve body and thereby disengaging the actuator body from the valve body;
  the at least one valve assembly comprising at least one Normally Closed (NC) valve;
    wherein the NC valve is configured to allow activating an actuator engaged therewith with pressurized fluid and thereby opening the NC valve;
    wherein the servicing tool set comprises a ratchet and at least one socket engageable with the ratchet and with at least one actuator body, and
    wherein the actuator is activated by the at least one ratchet.

In some embodiments each of the at least one socket comprises a wall having a free end, and an aperture in the wall and/or a slot extending in the wall from the free end, wherein the aperture and/or slot are sized and shaped to accommodate a nipple, the nipple sized and shaped to allow activating the actuator with the pressurized fluid.

In some embodiments the at least one actuator body comprises a hexagonal prism.

In some embodiments the ratchet is configured to allow a pressurized fluid tube to be connected thereto, and pressurized fluid within the tube to pass via the ratchet into the actuator.

In some embodiments the actuator body has a manual override, and the socket has sufficient length L to reach an engagement region of the actuator body.

In some embodiments the actuator body and/or the socket further comprise at least one guide to facilitate correct alignment.

In some embodiments the pressurized fluid is selected from air, water and oil.

In some preferred embodiments the pressurized fluid is oil.

In some embodiments the tool set comprises a socket having resilient means for firmly engaging the actuator.

In some embodiments resilient means are selected from a resilient material, at least one resilient element and combinations thereof.

In some embodiments the tool set comprises a socket having at least one prong for firmly engaging the actuator.

In some embodiments the at least one prong comprises a bulge.

In some embodiments wherein the at least one prong has at least one thin end.

In some embodiments the socket further comprises an aperture allowing the application of pressure on at least one prong.

In some embodiments the socket further comprises at least one hole allowing inserting a screw through the socket and onto the at least one prong.

Some of the improved kits allow using a plurality of sizes of valves, and a plurality of shapes such as: Hexagonal valves and rounded valves. These improved socket wrench embodiments allow a good fixation of all kinds of actuators (nipple to the side or on the top).

BRIEF DESCRIPTION OF THE DRAWINGS

FIG. 1a is an exploded perspective view of a prior art fluid control valve assembly;

FIG. 2b is a top view of the assembly depicted in FIG. 2a;

FIG. 3a is an elevational perspective view of another improved fluid control valve assembly;

FIG. 3b is a top view of the assembly depicted in FIG. 3a;

FIG. 4a is one perspective view of an improved servicing tool set;

FIG. 4b is another perspective view of the improved servicing tool set illustrated in FIG. 4a;

FIG. 5b is one elevational perspective view of an improved servicing tool set suitable for the valve assembly illustrated in FIG. 5a;

FIG. 6b depicts inner parts of the improved socket illustrated in FIG. 6a;

FIG. 7 is a perspective elevated and exploded view of a fluid control system embodiment comprising the improved tool set with a valve assembly;

FIG. 8b is another elevated perspective view of the same embodiment with the tool set and the valve assembly illustrated in FIG. 8a;

FIG. 9 is a perspective elevated and exploded view of another system embodiment;

DETAILED DESCRIPTION OF THE EMBODIMENTS

Figure 1B:
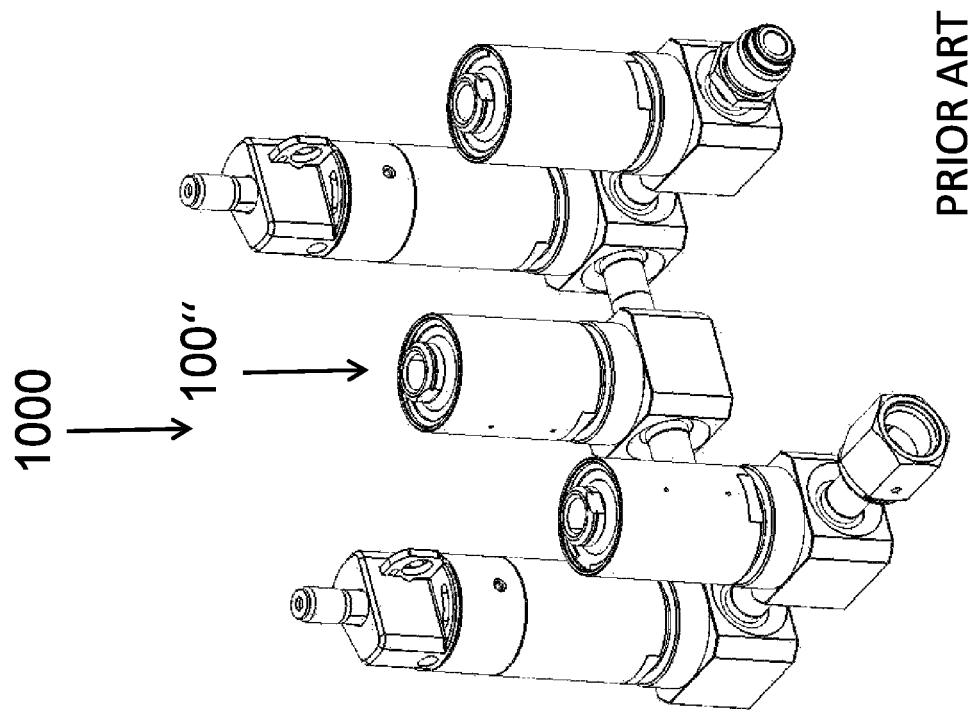
FIG. 1b is an elevational perspective view of a prior art series of fluid control valve assemblies.

FIG. 1a depicts a prior-art fluid control valve assembly 100'. The valve assembly 100' may be described as comprising two major parts: a valve 110 and an actuator 120. The valve 110 typically has 2-4 ports (not shown), each serving as a fluid inlet or fluid outlet. The outer part of the valve 110 includes the valve body 111, which may hold therein valve assembly components such as a seat 112, a seat holder 114 and diaphragms 116.

The seat 112, seat holder 114 and diaphragms 116 may be structured to engage with each other and be assembled and stably held inside the valve body 111. The actuator 120 includes an actuator body 122 that houses actuator components (not shown).

The actuator body 122 may include a male thread 126, and the valve body 111 may include a female thread 118. The actuator body 122 can be secured to the valve body 111 by engaging the male thread 126 with the female thread 118 and employing rotation. In other assemblies the valve body may include a male thread and the actuator body may include a female thread.

The actuator 120 further comprises a nipple 128. Pressurized fluid can be provided via a tube (not shown) to the nipple 128. The nipple 128 is operationally coupled to the actuator components. The diaphragms 116 may be operationally coupled to the actuator 120 on one side and the other valve components on the other side, such that the pressurized fluid activates the actuator 120 to move the diaphragms 116 between at least two positions, thereby opening the valve assembly 100' to flow between at least two ports, or deactivates the actuator 120, thus closing the valve 110 to flow according to the position of the diaphragms 116.

A first flat face 124 facilitates engagement of a spanner or similar tool or tool set (not shown) with the actuator body 122. Employment of the tool/tool set with a well-defined force can secure the actuator 120 with the valve 110 such that the valve assembly 100' is leak free. Typically, a second flat face (not shown) is situated opposite the first flat face 124 to allow firm engagement of a spanner end with the actuator body 122.

The valve assemblies may require periodic maintenance, particularly if the valves are used for special applications such as processes requiring ultrahigh purity valves for gas delivery. It can also be due to switching to different media/fluid that machines (bubblers) need to work with—in cases like these, all the internal parts of the valve (and valve's body) need to be cleaned/replaced.

Typically, the maintenance requires replacement of the seat 112, seat holder 114 and diaphragms 116 due to wear.

Such maintenance requires disengaging the actuator 120 from the valve 110.

However, sometimes the valve assembly 100' needs to be installed in a system wherein access to the valve assembly 100' post installation from the side is very restricted due to small clearances from other components in the system or nearby walls or equipment. In such situations of small clearance access with a spanner to the flat faces 124 might be very difficult or impossible.

For example, as shown in FIG. 1b, a valve assembly series 1000 might have at least one valve assembly 100" that is hard to access and open/close with an open-end spanner or perhaps even with a socket spanner.

According to one aspect, a fluid control system is provided comprising a servicing tool set and at least one valve assembly comprising an actuator and a valve operationally engageable therewith:

Each valve comprises a valve body.

Each actuator comprises an actuator body having an upper base and side walls.

The upper base or the side walls comprise at least three flat faces.

Each actuator body is engageable with a valve body.

The system is configured to allow:

engaging the servicing tool set with at least three flat faces, and subsequently applying torque to an actuator body engaged with a valve body and thereby disengaging the actuator body from the valve body.

Figure 2B:
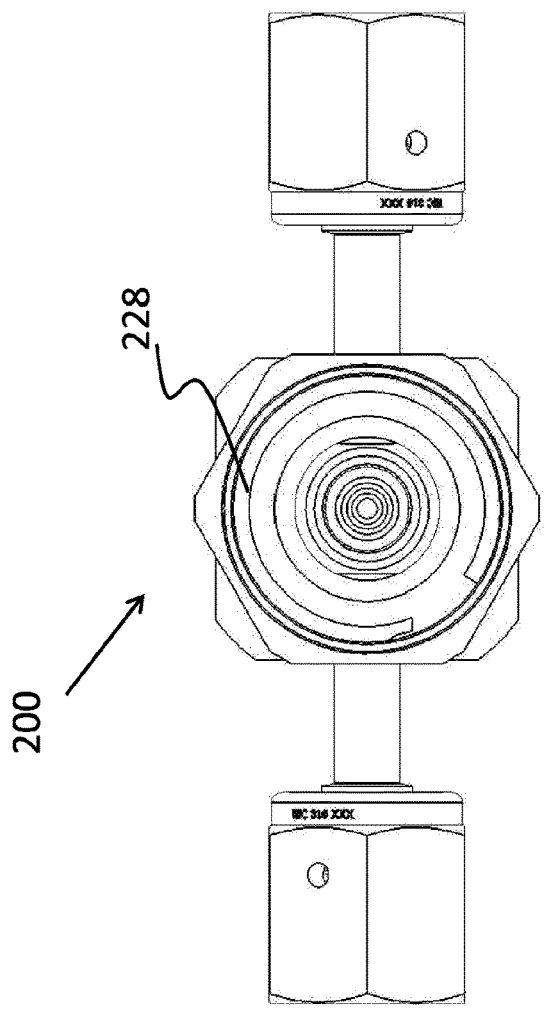
Figure 2A:
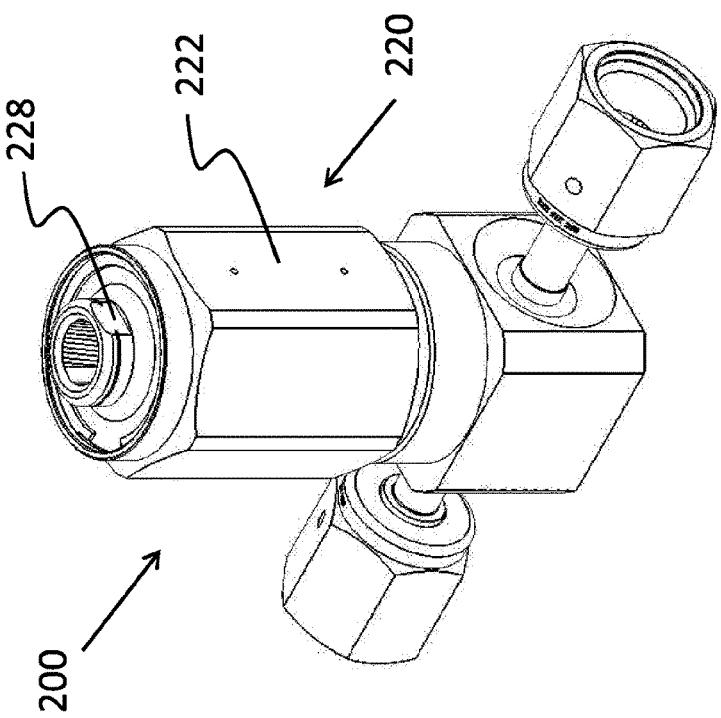
FIG. 2a is an elevational perspective view of an improved fluid control valve assembly.

FIG. 2a is an elevational perspective view of an improved fluid control valve assembly 200. The valve assembly 200 comprises an actuator body 222 that is in the shape of a prism with a hexagonal cross section, i.e., the actuator body 222 comprises a hexagonal prism.

FIG. 2b is a top view of the improved valve assembly 200 depicted in FIG. 2a.

The valve assembly 200 further comprises a nipple 228 through which compressed fluid may be provided to the actuator 220.

The hexagonal cross section shape of the actuator body 222 allows improved access by an open spanner, or a socket spanner (not shown) having a compatible hexagonal socket also from the top.

Other assemblies (not shown) may be differently shaped. For example, if it is possible to fit the spanner on the actuator body and turn the actuator body a full 90 degrees; the actuator body may have a square cross section. The square shape has a reduced chance of stripping corners off the actuator body. If the geometry is tighter such that rotating the actuator body is limited by the tool's range of motion, then the illustrated hex shape may be more suitable. With further restrictions on the movement, the actuator body may comprise a prism with 8 sides or even more. The trade-off of increasing the prism sides is that is that if there is need to force the wrench, then the prism corners might be more easily worn off.

Odd numbers of sides of the cross section of the actuator body would require that the wrench be non-symmetric: flat on one side and with a corner on the other.

Various cross section shapes of the actuator body may be designed. Other atypical, irregular or unique cross section shapes may serve to help prevent unauthorized manipulation of the valves.

In general, the serving tool or a tool set must have a component with a shape that substantially conforms to the actuator body and allows gripping the actuator body.

FIG. 3a is an elevational perspective view of another improved valve assembly embodiment 300; and FIG. 3b is a top view of the valve assembly embodiment 300 depicted in FIG. 3a.

The valve assembly 300 comprises a manual override 349. Accordingly, the actuator body 322 of the actuator 320 in valve assembly 300 has two actuator body regions: an upper cylindrical region 323a and a hexagonal prism engagement region 323b. The upper region 323a may be shaped so for the convenience of manual operation of the actuator and the hexagonal region 323b is shaped for improved engagement by a servicing tool set.

The valve assembly servicing tool sets may be standard tools such as commercially available open-ended spanners or socket spanners or ratchet/s and sockets.

However, at least in some systems comprising valve assemblies, in particular when the valves assemblies are in close quarters, improved servicing tool sets may be preferable. For example, some valve assemblies are normally closed (NC), such that when the actuator is not under a minimum pressure from a sufficiently pressurized fluid, the diaphragms are not in the correct position for opening the valve for service. Opening the valve, i.e. applying sufficient pressure to bring the diaphragms into the correct position, may be required in order to prevent damage to the actuator and/or valve, which might be very costly and/or difficult to replace. Improved tool sets may facilitate adjusting the valve assembly while maintaining the valve in the correct state during the service. Such adjustment with specific tightening torque value is possible with embodiments that comprise tool sets including a torque meter. Specific tightening torque value is calculated for good sealing and for preventing internal and external leakages; the actuator body presses on the diaphragms during the tightening.

Some system embodiments comprise at least one Normally Closed (NC) valve assembly comprising a valve and an actuator operationally engageable therewith; wherein the at least one NC valve assembly is configured to allow pressurized fluid to activate the actuator, and wherein the servicing tool set is further configured to allow operationally coupling the pressurized fluid to the actuator.

In some system embodiments operationally coupling the pressurized fluid to the actuator is via the ratchet.

FIG. 4a is one perspective view of an improved servicing tool set 400 for an improved valve assembly;

FIG. 4b is another perspective view of the improved servicing tool set 400 illustrated in FIG. 4a.

The improved tool set 400 comprises a ratchet 454 and a socket 452 coupled thereto. The socket 452 has a cavity 423a suitably sized and shaped to allow the socket 452 to mount on an actuator 320 and engage the actuator body 222/322 of the actuator 220/320, to effectively open and close the valve 220/320. The socket may be made by additive manufacturing such as, by way of example, 3D printing.

Furthermore, the ratchet 454 is configured to allow a pressurized fluid tube 456 to be connected thereto, and pressurized fluid within the tube 426 to pass via the ratchet 454 into the actuator.

In some embodiments the socket 452, in addition to being of the appropriate shape and size to engage the actuator body 322 without slipping, should be of sufficient length L to reach the engagement region 323b of actuator body 322 with at least one manual override 249.

The NC valve assembly 300, which is made up of an actuator 320 engaged with a valve 310, may be serviced by the improved tool set 400 by performing the following steps:
  a) Engaging the socket 452 with the engagement region 323b;
  b) Providing pressurized fluid to the tube 426 at a pressure sufficient to bring the valve into an open state;
  c) Subsequently employing torque on the actuator body 322 to remove the actuator 320 from the valve 310;
  d) Subsequently replacing valve assembly components within the actuator body and/or within body of the valve;
  e) Lightly engaging the actuator body with the body of the valve; typically, the engaging is performed by manually screwing the actuator body 322 a turn or two on the valve body 311;
  f) Subsequently providing again pressurized fluid to the tube 426 at a pressure sufficient to bring the valve into an open state, and
  g) Subsequently employing torque on the actuator body 322 to firmly engage the actuator body 322 with the valve body 311.

Note that in some embodiments various sockets may be used with the same improved ratchet 454, to fit various actuator bodies.

Figure 5A:
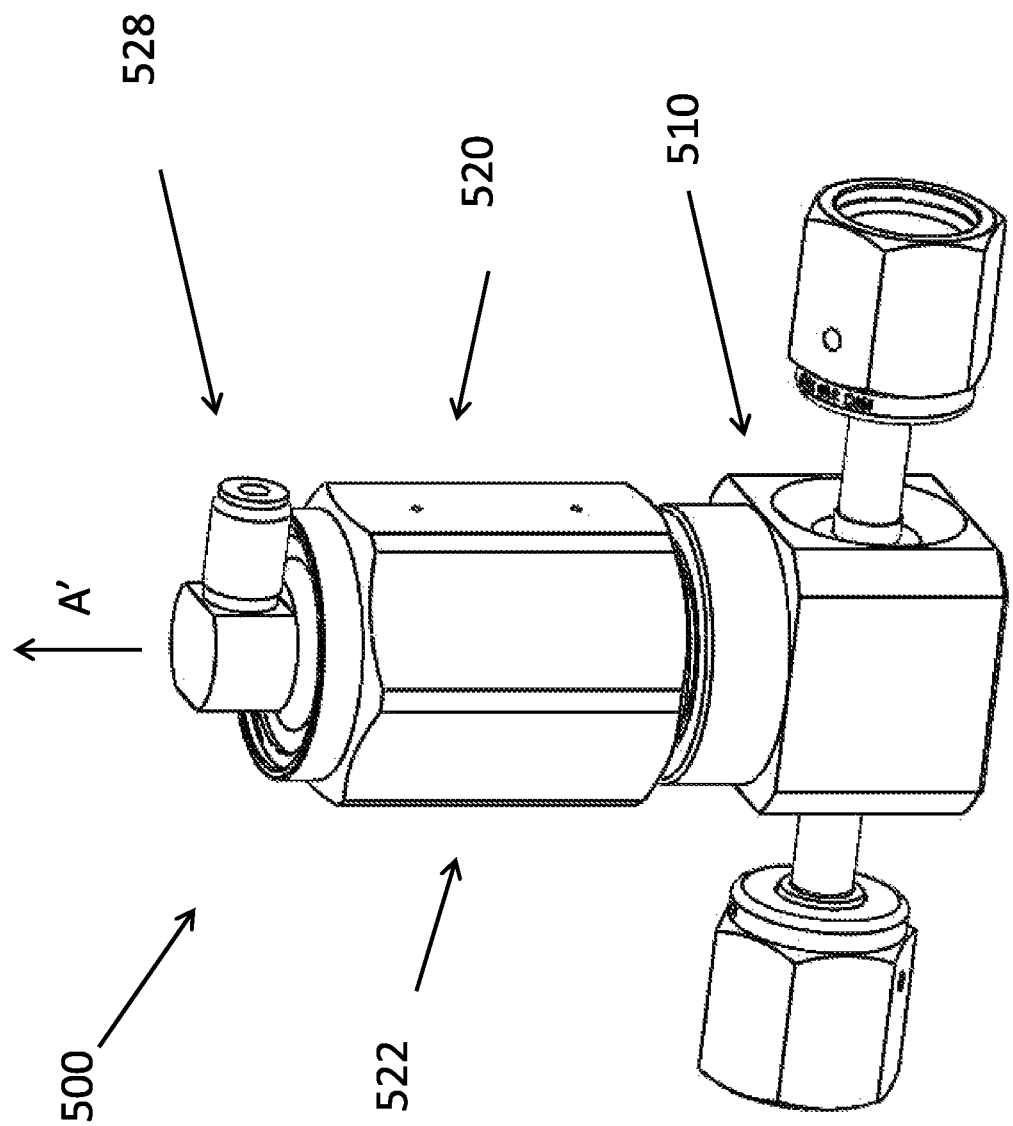
FIG. 5a is an elevational perspective view of yet another improved fluid control valve assembly.

Some improved valve assemblies 500—for example, as shown in FIG. 5a—further comprise a side-nipple 528 for engagement of a suitable pressurized fluid tube with the actuator 520, wherein the side nipple 528 extends in a direction perpendicular to the longitudinal axis A of the actuator body 522 is shown screwed into the body of the valve 510 through which the fluid may flow when the valve 510 is open. The actuator body 522 is hexagonal, so that it may be gripped by a matching special hexagonal socket and a ratchet for example. The hexagonal shape of the actuator body 522 allows more flexibility in adjusting than does one wrench flat 124 at one point on a commercially available actuator body, as shown, for example, in the prior art FIG. 1.

Alternatively, the improved actuators may have an orifice extending throughout the actuator body (not shown), but not the nipple. A tube may be coupled with a suitable nipple to the orifice.

In some system embodiments the at least one NC valve assembly comprises a nipple and the servicing tool set comprises a ratchet and at least one socket engageable with the actuator body, wherein the at least one socket is sized and shaped to accommodate the nipple.

In some embodiments each of the at least one socket comprises a wall having a free end, and an aperture in the wall and/or a slot extending in the wall from the free end, wherein the aperture and/or slot are sized and shaped to accommodate a nipple, the nipple sized and shaped to allow coupling a pressurized fluid tube to the at least one NC valve assembly.

Figure 5B:
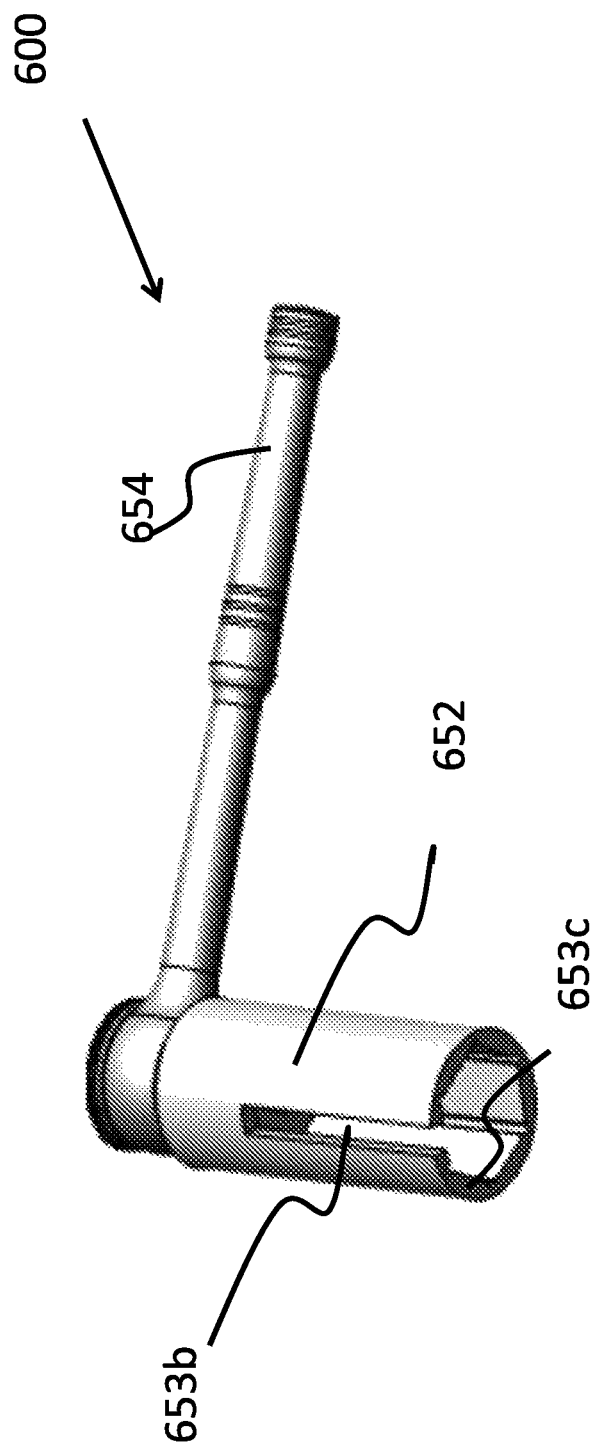

FIG. 5b illustrates in a perspective view an improved tool set 600 that can service such improved valve assemblies 500.

The improved tool set comprises a socket 652 having a slot 653b. The slot 653b is sized and shaped to allow a tube with pressurized fluid (not shown) to connect with an actuator 520 via the slot 653b. The ratchet in some embodiments comprises a torque meter; in other embodiments the ratchet does not include a torque meter.

A NC valve assembly 500 comprising a valve 510 and an actuator 520 with a side-nipple 528, and an actuator body 522, may be serviced by the improved tool set 600 by performing the following steps:
  a) Engaging the socket 342 with the engagement region;
  b) Providing a tube capable of conveying pressurized fluid to the actuator, and connecting the tube to the actuator;
  c) Providing pressurized fluid to the tube 326 at a pressure sufficient to bring the valve into an open state;
  d) Subsequently employing torque on the actuator body to remove the actuator body from the valve;
  e) Subsequently replacing valve assembly components within the actuator and/or within the valve;
  f) Gently engaging the socket 342 with the actuator;
  g) Subsequently providing again pressurized fluid to the tube 326 at a pressure sufficient to bring the valve into an open state, and
  h) Subsequently employing torque on the actuator body to firmly engage the actuator body with the valve.

Note that the nipple 248 or orifice need to be aligned with the slot 653b to allow the engagement, i.e., if the orientation of the socket 652 is not appropriate then the socket 652 will not properly engage with the actuator body 522, if using a nipple or the orifice will be covered by the socket.

In some embodiments the actuator body and/or the socket may further comprise at least one guide to facilitate correct alignment. For example, the free end of the socket may be sloped towards the slot so that simultaneously rotating the socket and pushing the socket onto the actuator body will easily correctly orientate the socket.

In some embodiments the fluid is air; in some embodiments the fluid is selected from water or oil. Oil may allow the tubing to be short, which may be an advantage in systems wherein the space is limited.

In some embodiments the valve assemblies and compatible tool sets are provided as kits comprising at least one valve assembly and at least one tool set.

In some embodiments the tool set is power-driven. For example, in various embodiments the tool set may be driven by hydraulic pressure, mechanical pressure, magnetic actuation or by an electric motor.

In some particular embodiments the tool set is driven by the pressurized fluid. In some alternative embodiments the tool set provides the pressurized fluid. Such tool sets may be particularly useful to service production lines that are powered down for maintenance of the line, or when servicing is required during power cuts. Often an unplanned power cut is a rare occasion when such servicing can be done and the ability to safely open a NC valve and connected actuator solely with the power of a servicing tool set is very valuable.

One skilled in the art will appreciate that the features described above may vary in shape and structure from those shown in the figures but fulfill the same or similar purpose such as to essentially achieve the same results.

Figure 6B:
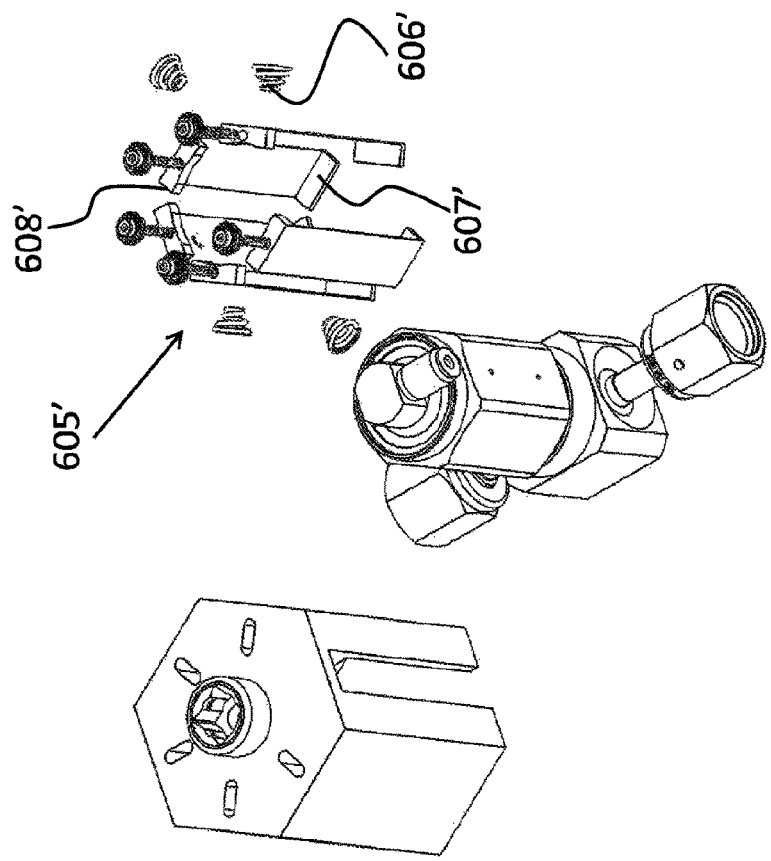
Figure 6A:
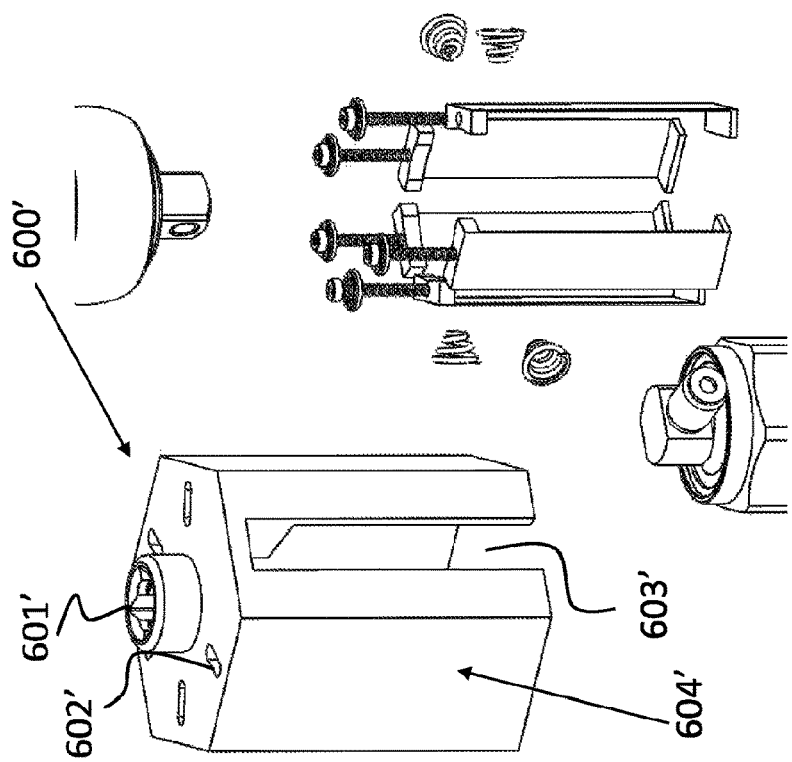
FIG. 6a is one elevational perspective view of an improved socket for an improved servicing tool set.

FIG. 6a shows a design of a new and improved hexagonal socket '600' that includes seven major parts:
  The socket entry 601' which can be coupled with the ratchet.
  Five screw holes 602' that allow fixation or firm grasp of the socket on the actuator after placing screws therein.
  A vertical slot 603' along the socket which allows the nipple of the actuator to fit in the socket.
  Six outer rectangular walls 604', one with the slot 603'.

As depicted in FIG. 6b, the inner part of the socket has three additional parts:
  Five prongs 605';
  Five springs 606'. Each spring 606' is in contact with an inner part of outer wall 604' and a prong 605' of the socket 606. Each spring 606' allows elastic movement to a prong 605' and a good fixation or engagement of the actuator inside the socket 600'.
  Every prong 605' has a bottom tooth 607' that allows additional fixation or firmness of the engagement of the actuator inside the socket 600' by sliding under the actuators' body onto a narrow part.

Similarly, another top tooth 608' may allow even firmer engagement.

The socket may be made by additive manufacturing.

In similar embodiments other resilient elements replace the springs. In yet other embodiments the socket comprises therein resilient material that serves to urge the prongs onto the actuators' body. In some embodiments a combination of resilient elements and/or materials may be used to urge the prongs onto the actuator body. The sockets may be made by additive manufacturing.

In some embodiments the prongs do not have top teeth or have less than five teeth. In some embodiments there are no prongs or less than five prongs.

Suitable screws (not shown) can be screwed via the holes 602' to further grip the actuator. The holes 602' may be in the shape of slots, so that the screws may be moved inside the holes 602' to fit various actuator sizes.

The modified sockets not only allow firmer grasping of the actuator, they also allow using the sockets for various sizes of actuators, for example both ½" and ¼" bodies. Moreover, in many systems the assemblies are still of the prior art type, i.e., the actuator body is still cylindrical, perhaps with a small flat area at the lower region of the body, as is shown in FIG. 1a.

Such sockets would be valuable in allowing serving both the prior art assemblies and newer assemblies that still include actuators of the old type before they are phased out. Servicing such assemblies in tight quarters is difficult and the prevention of the need to switch sockets can save considerable time. The sockets may be made by additive manufacturing.

FIG. 7 shows an exploded view of the wrench and socket with the valve assembly 500' having a side-nipple. The assembly of the socket-wrench set and the valve actuator embodiment 700 involves five major parts that are coupled together. A prior-art ratchet can be coupled with the socket entry 601' and allow rotation of the actuator body. The actuator 500' gets inside the socket 600' and applies force on the prongs 606' of the socket. The springs 605' change their configuration depending on the size of the actuator. The prongs 606 change their configuration too and allow holding the actuator 500'. The side nipple can be placed in the vertical slot 603 in the socket.

Figure 8B:
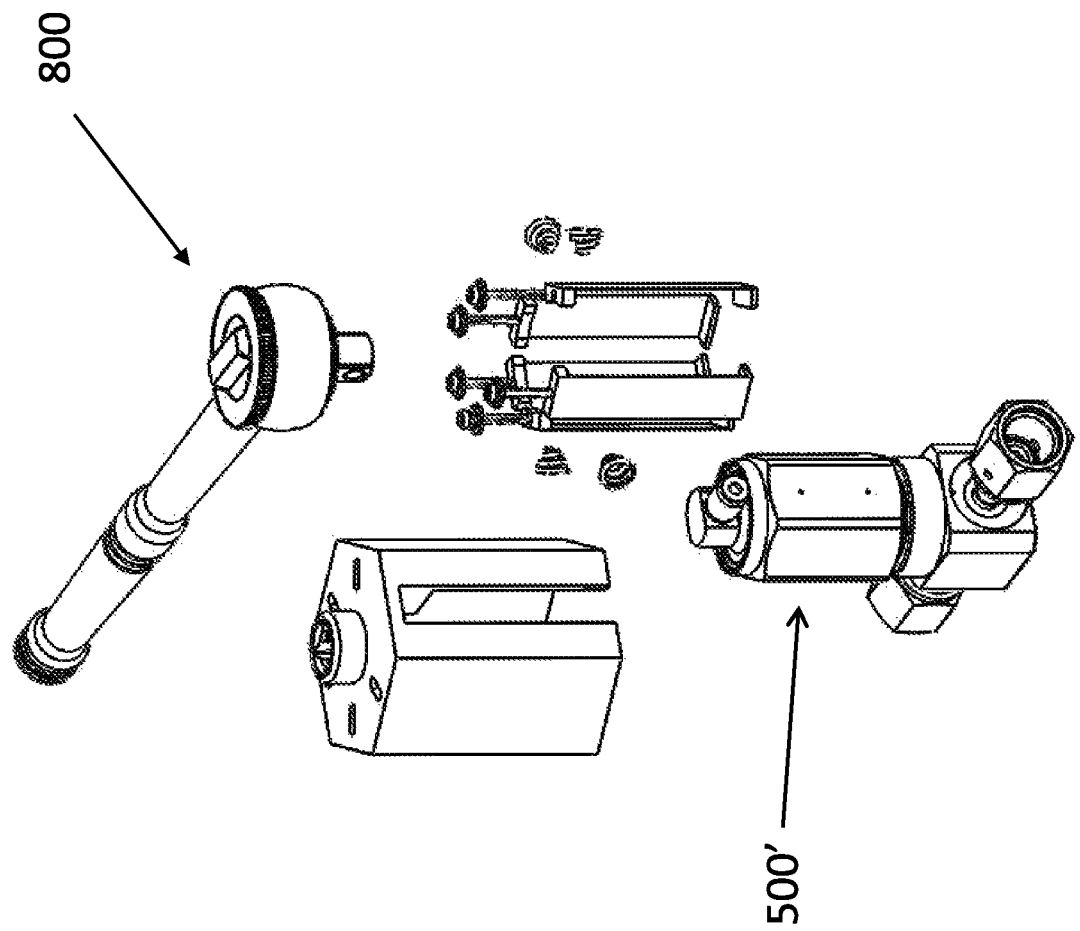
Figure 8A:
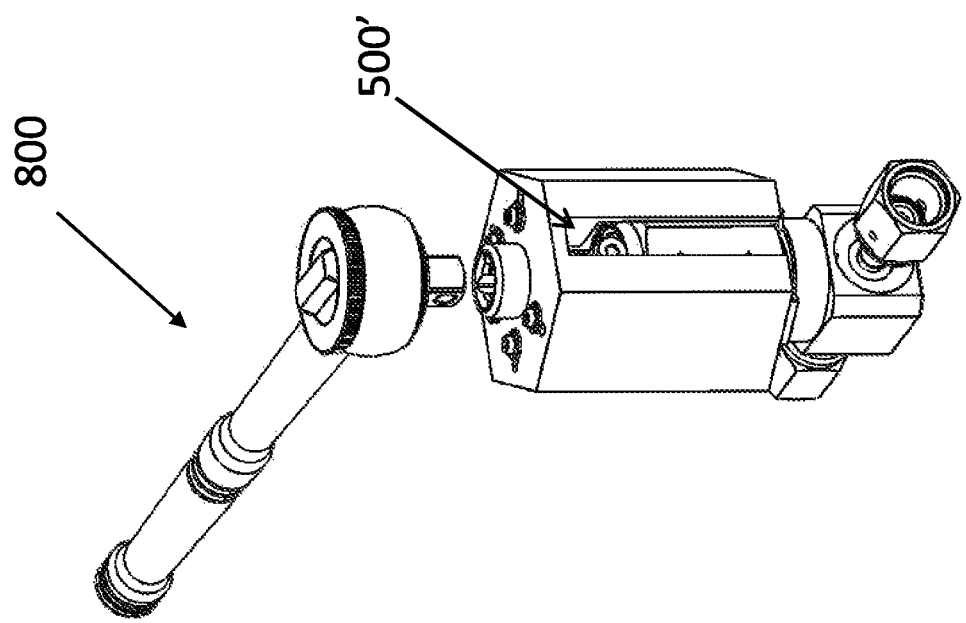
FIG. 8a is an elevated perspective view of the same improved tool set engaged with the valve assembly.

FIG. 8a shows in a perspective elevated view the same improved socket with the valve assembly. The actuator 500' is fixed inside the socket by applying pressure of prongs thereon, which are fixed by tightening five screws placed at desired positions/locations according to the. actuator's size.

FIG. 8b shows another perspective view of the same system depicted in FIG. 8a from an elevated angle. The ratchet is coupled with the socket. The socket is adjusted to the actuator 500' size via the forces applied on the elastic elements that can adjust their place accordingly.

FIG. 9 shows a perspective elevated and exploded view of another improved socket 900. This socket has some additional features not present in the embodiments described above. First, there is an additional, horizontal aperture 960. The aperture 960 enables access to the prongs 905" inside the socket, to help pry them off the actuator after the service is finished. For example, a sharp object such as a needle or rod may be inserted and pushed against the prongs. In general, we have found that pushing one or two prongs suffices to easily remove the socket 900 from the actuator.

Careful inspection of the prongs 905" and comparison to the prongs 605' in FIG. 6b reveals that the prongs 905" in the presently described embodiment have a corner 911" between the top end 908" and the prong body 904". The system is configured to allow pushing at least one corner 911" facilitating release of the socket 900 from engagement with the actuator 500'. The prong 905" further comprises a bulge 909". This bulge may be situated a little underneath the level of the aperture 960 for good effectiveness in helping to release the prongs 905" when the prongs 905" are pushed on their corner 911" via the aperture 960.

The prongs 905" may also have thin edges at their ends, particular at the bottom, that can help make them resilient and help with the fixation of the actuator inside the socket.

Figure 10C:
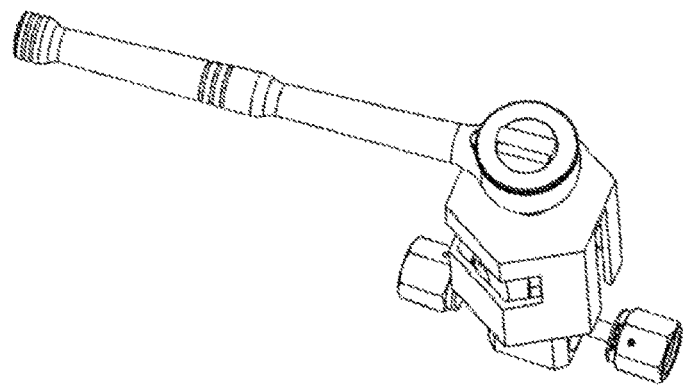
FIG. 10c illustrates another elevated view of the embodiment depicted in FIG. 10b.
Figure 10B:
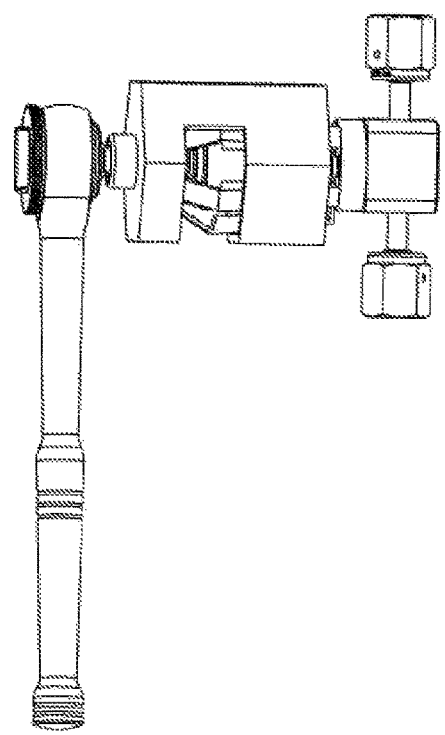
FIG. 10b shows a side view of the embodiment depicted in FIG. 9.
Figure 10A:
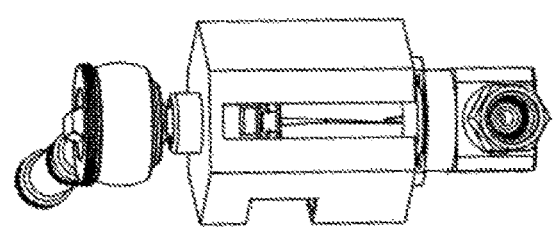
FIG. 10a shows another elevated view of the embodiment depicted in FIG. 9.

FIG. 10a shows another elevated view of the embodiment depicted in FIG. 9;

FIG. 10b shows a side view of the embodiment depicted in FIG. 9, and

FIG. 10c illustrates another elevated view of the embodiment depicted in FIG. 9. The sockets may be made by additive manufacturing.

The embodiments above comprising sockets that have urging means for firm engagement of the actuator are described for actuators having side nipples. Similar sockets can be used for actuators having the nipples at the top. The socket may be made by additive manufacturing, such as, by way of example, 3D printing.

Clarifications about Terminology

It should be noted that the term "item" as used herein refers to any physically tangible, individually distinguishable unit of packaged or unpackaged good or goods. Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

"Coupled with" means indirectly or directly "coupled with".

It is important to note that the methods described above are not limited to the corresponding descriptions. For example, the method may include additional or even fewer processes or operations in comparison to what is described herein and/or the accompanying figures. In addition, embodiments of the method are not necessarily limited to the chronological order as illustrated and described herein.

It should be understood that where the claims or specification refer to "a" or "an" element or feature, such reference is not to be construed as there being only one of that element. Hence, reference to "an element" or "at least one element" for instance, may also encompass "one or more elements".

Unless otherwise stated, the use of the expression "and/or" between the last two members of a list of options for selection indicates that a selection of one or more of the listed options is appropriate and may be made.

It is noted that the term "perspective view" as used herein may also refer to an "isometric view" and vice versa.

It should be appreciated that certain features which are, for clarity, described in the context of separate embodiments, may also be provided in combination in a single embodiment. Conversely, various features, which are, for brevity, described in the context of a single embodiment, example and/or option, may also be provided separately or in any suitable sub-combination or as suitable in any other described embodiment.

Certain features described in the context of various embodiments are not to be considered essential features of those embodiments, unless the embodiment is inoperative without those elements. Accordingly, features, structures, characteristics, stages, methods, modules, elements, entities or systems disclosed herein, which are, for clarity, described in the context of separate examples, may also be provided in combination in a single example. Conversely, various features, structures, characteristics, stages, methods, modules, elements, entities or systems disclosed herein, which are, for brevity, described in the context of a single example, may also be provided separately or in any suitable sub-combination.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

In the description and claims of the present application, each of the verbs, "comprise," "include" and "have" and conjugates thereof, are used to indicate that the object or objects of the verb are not necessarily a complete listing of components, elements or parts of the subject or subjects of the verb. In the discussion unless otherwise stated, adjectives such as "substantially" and "about" modify a condition or relationship characteristic of a feature or features of an embodiment. The terms are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of, items it conjoins.

Descriptions of embodiments in the present application are provided by way of example and are not intended to limit the scope. The described embodiments comprise different features, not all of which are required in all embodiments. Some embodiments utilize only some of the features or possible combinations of the features. Variations of embodiments of that are described, and embodiments comprising different combinations of features noted in the described embodiments, will occur to persons of the art.

What is claimed is:

1. A fluid control system comprising a servicing tool set and at least one valve assembly comprising an actuator and a valve operationally engageable therewith;
    each valve comprising
        a valve body;
    each actuator comprising an actuator body having an upper base and side walls;
wherein each actuator body is engageable with a valve body, and
    wherein the system is configured to allow:
        engaging the servicing tool set with the actuator, and subsequently applying torque to an actuator body engaged with a valve body and thereby disengaging the actuator body from the valve body;
    the at least one valve assembly comprising at least one Normally Closed (NC) valve;
    wherein the NC valve is configured to allow activating an actuator engaged therewith with pressurized fluid and thereby opening the NC valve;
    wherein the servicing tool set comprises a ratchet and at least one socket with a vertical slot formed along one side, the at least one socket engageable with the ratchet and with at least one actuator body, and
    wherein activating the actuator is via the ratchet, and wherein the at least one socket has at least one elastically biased prong capable of firmly engaging the actuator, each prong comprising a substantially rectangular body and two ends, and wherein each of the two ends comprises a radially inwardly extending tooth.

2. The system of claim 1, wherein the ratchet is configured to allow a pressurized fluid tube to be connected thereto, and pressurized fluid within the tube to pass via the ratchet into the actuator.

3. The system of claim 2, wherein the actuator body has a manual override and the socket has sufficient length L to reach an engagement region of the actuator body.

4. The system of claim 1, wherein the body of the at least one of elastically biased prongs comprises a bulge.

5. The system of claim 1, wherein the socket further comprises an aperture allowing applying pressure on the at least one elastically biased prong.

6. The system of claim 1, the at least one elastically biased prong further comprising a corner between at least one end and the body, the system configured to allow applying pressure on the corner facilitating release of the socket from engagement with the actuator.

7. The system of claim 1, the socket further comprising at least one hole allowing inserting a screw through the socket and onto the at least one elastically biased prong.

8. The system of claim 7, wherein said at least one hole is a slot configured to allow affixing the prongs with a screw to adjust the socket's dimensions for various actuator sizes.

9. The system of claim 1, wherein the socket further includes at least a second elastically biased prong having a substantially rectangular body installed such that a long side of the body is adjacent to a long side of the body of the at least one elastically biased prong.

10. The system of claim 1, wherein the socket further includes at least a second prong having a substantially rectangular body installed such that a long side of the body is adjacent to a long side of the body of the at least one elastically biased prong.

11. A fluid control system comprising a servicing tool set and at least one valve assembly comprising an actuator and a valve operationally engageable therewith;
    each valve comprising
        a valve body;
    each actuator comprising an actuator body having an upper base and side walls;
    wherein each actuator body is engageable with a valve body, and
    wherein the system is configured to allow:
    engaging the servicing tool set with the actuator, and
    subsequently applying torque to an actuator body engaged with a valve body and thereby disengaging the actuator body from the valve body;
    the at least one valve assembly comprising at least one Normally Closed (NC) valve;
    wherein the NC valve is configured to allow activating an actuator engaged therewith with pressurized fluid and thereby opening the NC valve;
    wherein the servicing tool set comprises a ratchet and at least one socket with a vertical slot formed along one side, the at least one socket engageable with the ratchet and with the actuator body, and
    wherein activating the actuator is via the ratchet, and wherein the at least one socket has at least one elastically biased prong capable of firmly engaging the actuator, each prong comprising a substantially rectangular body and two ends, and wherein at least one of the two ends comprises a radially inwardly extending tooth configured to slide under a portion of the actuator body.

* * * * *